Sept. 7, 1954     W. D. LEWIS     2,688,700
UNIVERSAL SCANNING MECHANISM FOR RADAR
Filed Sept. 7, 1946     4 Sheets-Sheet 1

INVENTOR
W. D. LEWIS
BY J. MacDonald
ATTORNEY

Sept. 7, 1954 W. D. LEWIS 2,688,700
UNIVERSAL SCANNING MECHANISM FOR RADAR
Filed Sept. 7, 1946 4 Sheets-Sheet 3

INVENTOR
W. D. LEWIS
BY J. MacDonald
ATTORNEY

Sept. 7, 1954  W. D. LEWIS  2,688,700
UNIVERSAL SCANNING MECHANISM FOR RADAR
Filed Sept. 7, 1946  4 Sheets-Sheet 4
FIG. 5
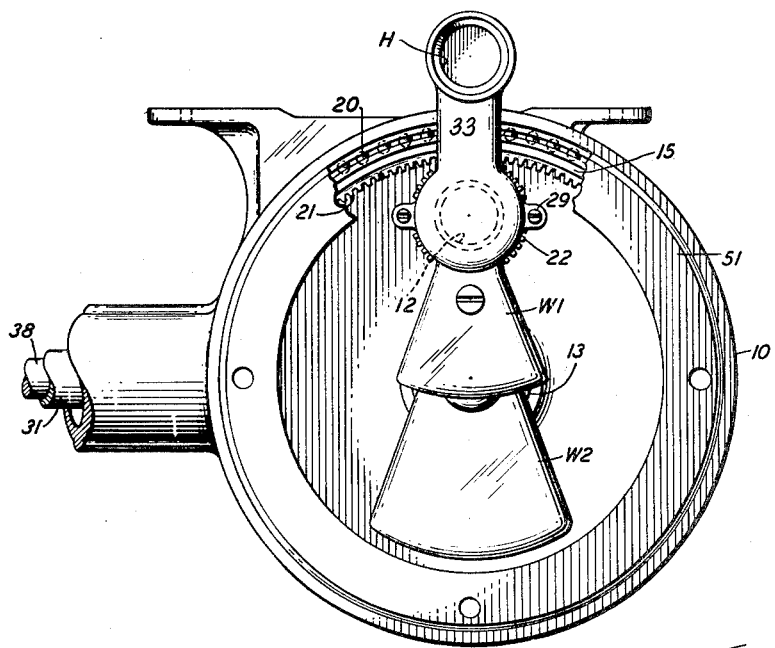
FIG. 6A
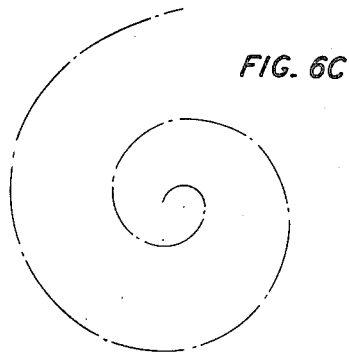
FIG. 6C
FIG. 6D
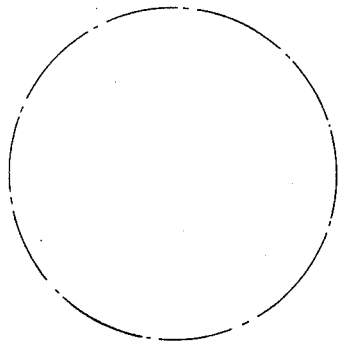
FIG. 6B
FIG. 6E
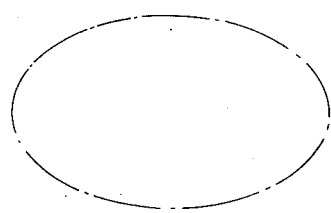
INVENTOR
W. D. LEWIS
BY J. MacDonald
ATTORNEY Patented Sept. 7, 1954

2,688,700

UNITED STATES PATENT OFFICE 2,688,700

UNIVERSAL SCANNING MECHANISM FOR RADAR

Willard D. Lewis, Little Silver, N. J., assignor to Bell Telephone Laboratories, Incorporated, New York, N. Y., a corporation of New York Application September 7, 1946, Serial No. 695,569

3 Claims. (Cl. 250—33.63)

This invention relates to electric wave reflectors and more particularly to a scanning mechanism for use in such electric wave reflectors.

The object of the present invention is the provision in an electric wave reflector of a scanning mechanism in which the feed horn is actuated in a manner to generate a plurality of scanning geometrical figures as determined by the speed relation of two independently operating eccentric mechanisms.

In the drawing,

Fig. 5 is another front view shown with the feed horn 180 degrees from that shown in Fig. 3; and Figs. 6A, 6B, 6C, 6D, and 6E are few examples of geometrical figures obtained by the change in speed relation of the eccentric mechanisms.

Figure 1:
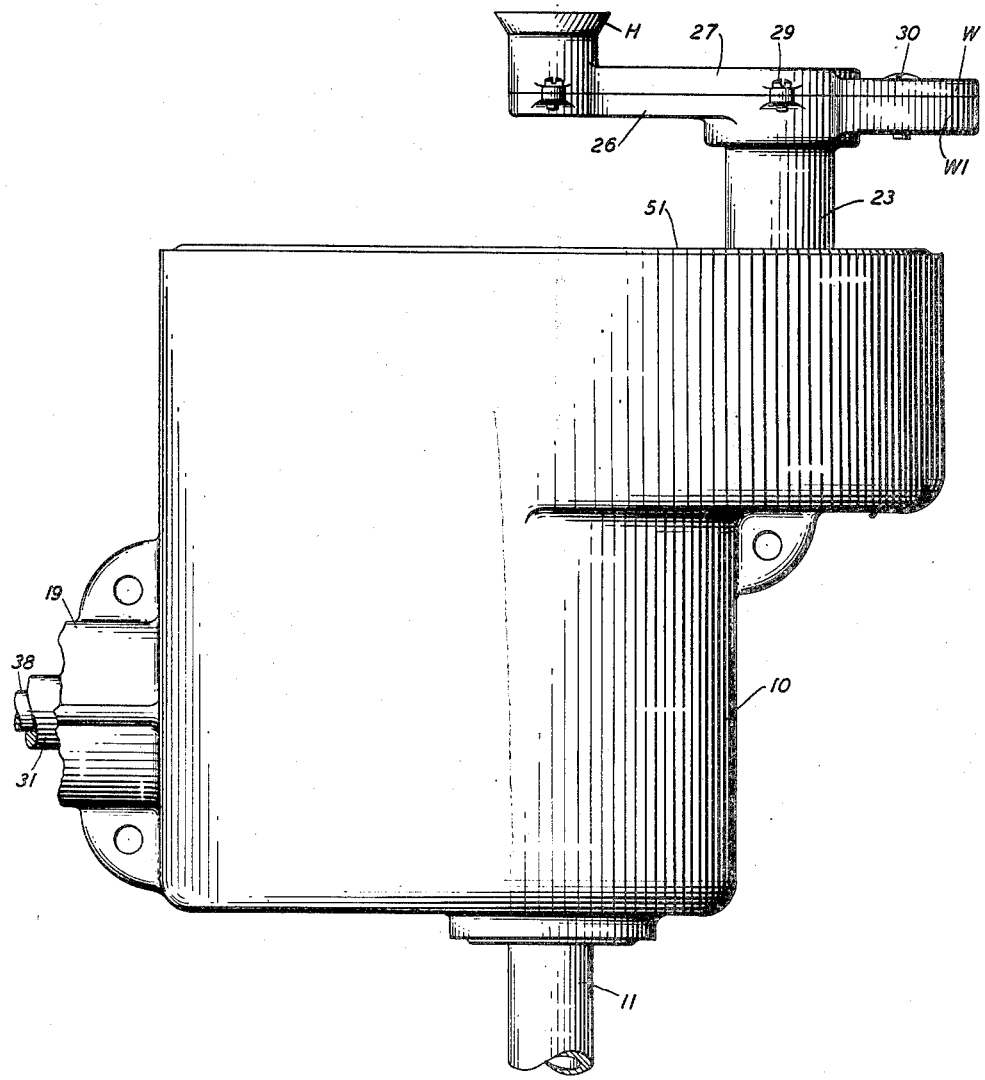
Fig. 1 is an assembly view showing the feed horn of the scanning mechanism positioned in coaxial relation to the longitudinal axis of its supporting eccentric shaft.

In the scanning mechanism of this invention, a casing 10 serves for mounting a tubular shaft 11 formed at one end thereof with an eccentric hollow crank arm portion 28 and a hollow spindle portion 12, the spindle portion 12 being provided for rotatably mounting a section 26 of a two part casing which will be hereinafter described in detail.

Figure 2:
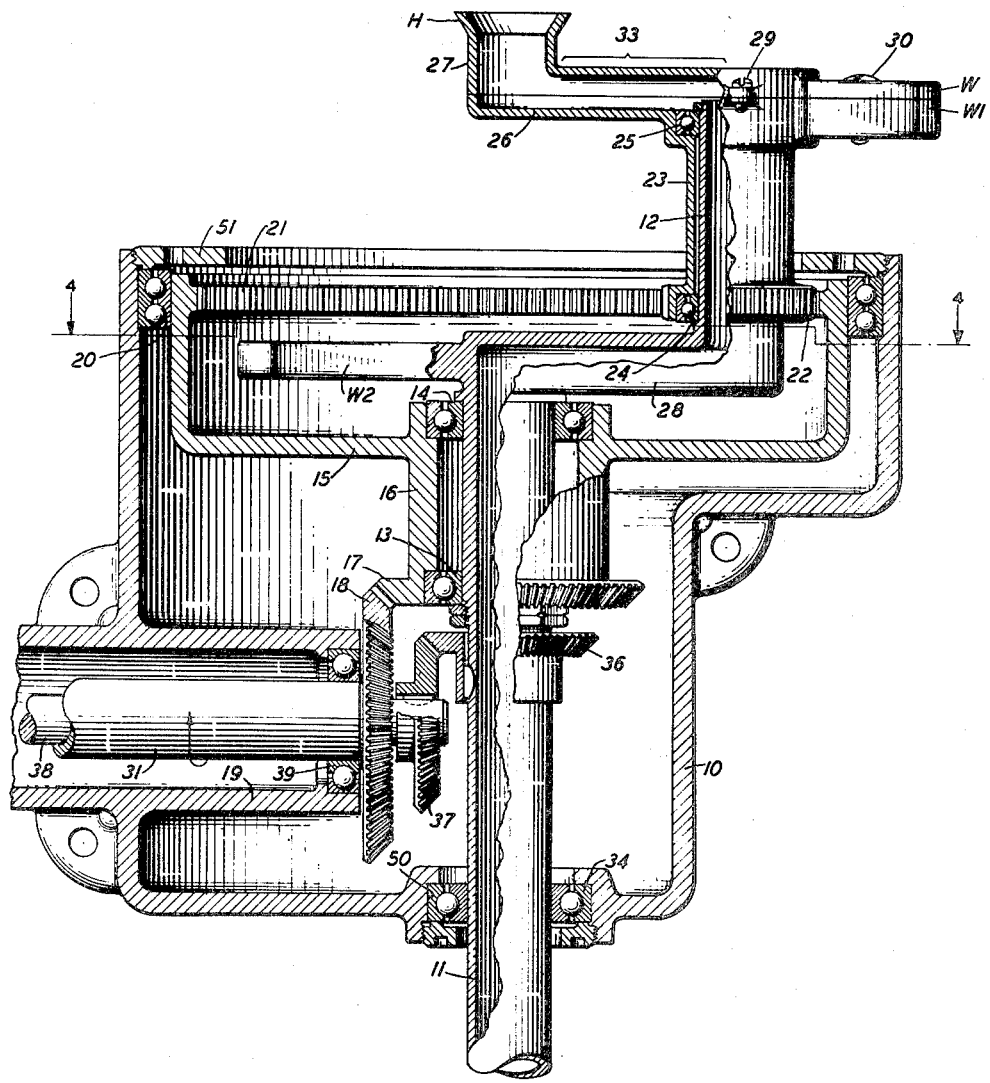
Fig. 2 is a view similar to that of Fig. 1 showing a number of operating parts in longitudinal section.
Figure 3:
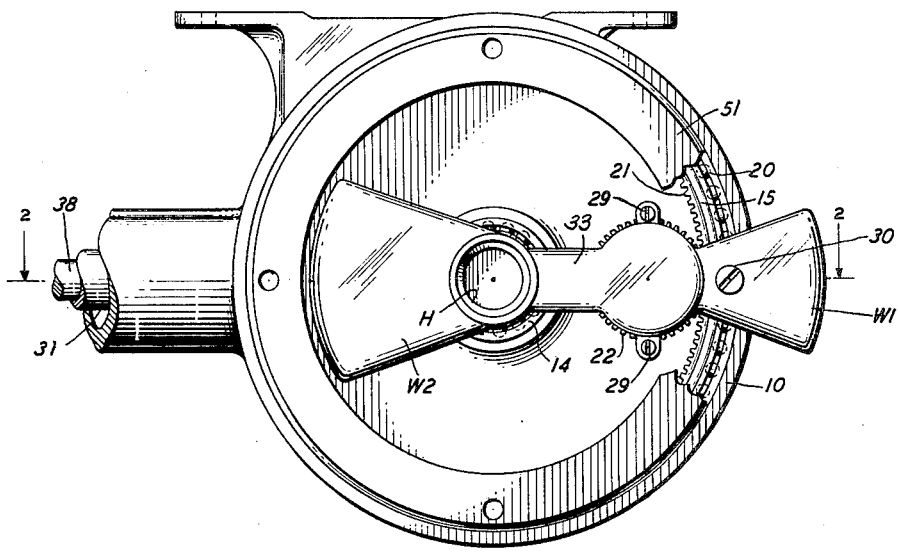
Fig. 3 is a front view of Fig. 1 shown with a number of operating parts with portions broken away.
Figure 4:
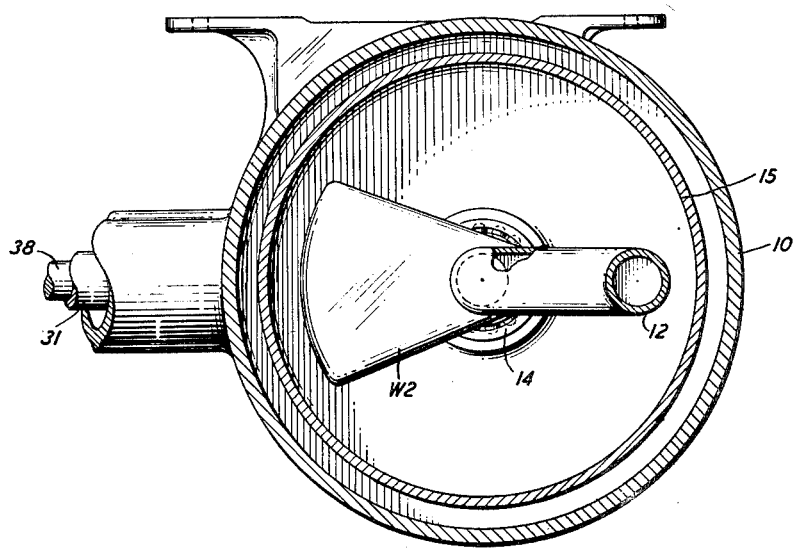
Fig. 4 is a cross-sectional view taken on line 4—4 of Fig. 2.

On the tubular shaft 11 is rotatably mounted as on ball bearings 13 and 14, best seen in Figs. 2, 3 and 4, a drum-shaped member 15, the hub portion 16 of which is formed with an angle gear 17 disposed in engagement with a similar gear 18 keyed on a hollow shaft 31 itself rotatably mounted as on ball bearing 39 fitted in the sleeve portion 19 of casing 10, while the drum-shaped member 15 is supported at its peripheral edge portion by a ball bearing 20 fitted in casing 10 as best seen in Figs. 2 and 5 and secured in adjusted position therein by a nut ring 51. The drum-shaped member 15 in turn serves to support through the ball bearing 14 the front disposed end of hollow shaft 11 in position concentric to that of casing 10 while the opposite end of hollow shaft 11 is supported by a ball bearing 34 fitted into a counterbore 50 in the casing 10.

An internal gear 21 which is carried by the drum-shaped member 15 engages with a pinion 22 keyed or formed with the sleeve 23 of casing section 26 rotatably mounted as on ball bearings 24 and 25 carried by the eccentrically disposed spindle 12. To the casing section 26 is secured a complemental casing section 27 which includes the feed horn portion H to form in cooperation with the arm portion 33 formed by casing sections 26 and 27, the tubular eccentrically disposed spindle portion 12, the tubular arm portion 28 and the hollow shaft 11, a portion of the wave guide, the casing section 27 being secured to casing section 26 by a plurality of screws 29 and a screw 30, the latter extending through a clearance hole in a counterweight portion W formed with casing section 27 in threaded engagement with a counterweight portion W1 formed with casing section 26.

The counterweight elements W and W1 serve to balance the arm portion 33 of the wave guide including the feed horn portion H while a counterweight W2 carried by the hollow shaft 11 serves to balance the eccentric portion 12, casing sections 26, 27 and crank arm 28.

On shaft 11 is keyed an angle gear 36 disposed in meshing engagement with a similar gear 37 keyed on one end of a shaft 38 rotatably mounted in the hollow shaft 31 itself rotatably supported by the ball bearing 39 fitted into the sleeve portion 19 of casing 10.

In the operation of the scanning mechanism of the invention considering the hollow shaft 11 in a stationary condition, the rotation of gear 18 on shaft 31 is effective to impart rotation to the drum-shaped member 15 to cause the rotation of the feed horn H on the eccentrically disposed spindle of hollow shaft 11 for generating a circle having for radius the distance from the center of feed horn H to the center of spindle 12. The rotation of hollow shaft 11 considering the drum-shaped member 15 and internal gear 21 carried thereby in a stationary condition, is effective to cause the feed horn H to generate a planetary scanning movement around a circle the radius of which is that of the distance from the longitudinal axis of shaft 11 to the longitudinal axis of spindle 12, and from the axis of spindle 12 to the center of feed horn H while the operation of both the shaft 11 and drum-shaped member 15 as effected by shafts 38 and 31 is effective to generate for example a straight horizontal line as shown graphically in Fig. 6A, a straight vertical line shown in Fig. 6B, a spiral as shown in Fig. 6C, a circle as shown in Fig. 6D, an ellipse as shown in Fig. 6E and other figures depending upon the speed variation of shaft 11 relative to the internal gear 21 and pinion 22 actuated thereby.

What is claimed is:

1. In a scanning mechanism comprising a casing, a pair of concentrically disposed drive shafts mounted for rotation in said casing, a driving gear keyed on each of said drive shafts within said casing, a tubular shaft mounted for rotation in said casing at right angles to said drive shafts, a drum-shaped member mounted for rotation on said tubular shaft, a gear carried by said drum-shaped member engaging one of said driving gears, a gear carried by said tubular shaft engaging the other of said driving gears, a crank element on the end of said tubular shaft within said drum-shaped member, said tubular shaft and said crank element forming a section of a wave guide, a horn-shaped scanning member for the wave guide mounted for eccentric rotation on said crank element, and separate driving mechanisms for rotating said tubular shaft and said horn-shaped scanning member for imparting scanning movements of different geometrical figures to the latter determined by the speeds of said separate driving mechanisms.

2. In a scanning mechanism a pair of independently operating driving shafts, a gear carried by each of said shafts, a pair of concentric hollow driven shafts each having a gear meshing with one of the first-mentioned gears, a drum-shaped member on one end of the outer of said concentric hollow driven shafts supporting a ring gear, a hollow crank formed on one end of the inner of said concentric hollow driven shafts within said drum-shaped member, a sleeve rotatably mounted on the handle portion of said crank and having a pinion meshing with said ring gear for rotating said sleeve, and a hollow horn-shaped scanning element on said sleeve and offset therefrom forming the receiving and transmitting end of a wave guide for said scanning mechanism, said horn-shaped scanning element together with said hollow crank and the inner of said drive shafts forming the wave guide for said mechanism.

3. In a scanning mechanism comprising a revolvable wave-guide shaft, a hollow crank mounted on said shaft having a hollow handle portion forming a section of the wave guide for said apparatus, a sleeve mounted for rotation on said handle portion of said crank, a horn-shaped element forming the receiving and transmitting end of said wave guide carried by said sleeve, said sleeve having a pinion secured thereon, and a ring gear engaging said pinion mounted for movement concentric to the shaft of said crank for rotating said sleeve to impart eccentric planetary scanning movements to said horn-shaped element depending upon the speeds of rotation of said crank and said sleeve.

References Cited in the file of this patent

UNITED STATES PATENTS

| Number | Name | Date |
|---|---|---|
| 317,731 | Colman | May 12, 1885 |
| 1,167,336 | Clark | Jan. 4, 1916 |
| 1,264,128 | Rataiczak et al. | Apr. 23, 1918 |
| 1,420,319 | Kelly | June 20, 1922 |
| 2,410,827 | Langstroth et al. | Nov. 12, 1946 |

FOREIGN PATENTS

| Number | Country | Date |
|---|---|---|
| 298,599 | Germany | Dec. 3, 1919 |
| 547,973 | France | Oct. 9, 1922 |